(12) United States Patent
Satony et al.

(10) Patent No.: US 12,357,091 B2
(45) Date of Patent: Jul. 15, 2025

(54) LOCKING SYSTEM

(71) Applicant: Accuride International GmbH, Diez (DE)

(72) Inventors: Christian Satony, Urbar (DE); Christoph Neuhaus, Niederelbert (DE)

(73) Assignee: Accuride International GmbH, Diez (DE)

( * ) Notice: Subject to any disclaimer, the term of this patent is extended or adjusted under 35 U.S.C. 154(b) by 28 days.

(21) Appl. No.: 18/125,323

(22) Filed: Mar. 23, 2023

(65) Prior Publication Data

US 2024/0164520 A1 May 23, 2024

(30) Foreign Application Priority Data

Mar. 24, 2022 (EP) .................................... 22164203

(51) Int. Cl.
*F16H 25/24* (2006.01)
*A47B 88/457* (2017.01)
(Continued)

(52) U.S. Cl.
CPC .......... *A47B 88/473* (2017.01); *A47B 88/457* (2017.01); *A47B 88/483* (2017.01);
(Continued)

(58) Field of Classification Search
CPC ..... F16H 25/2454; A47B 88/473; F16C 29/10
See application file for complete search history.

(56) References Cited

U.S. PATENT DOCUMENTS 4,149,430 A * 4/1979 F'Geppert ............... F16D 63/00
477/23
4,603,594 A * 8/1986 Grimm ................... F16H 25/20
188/106 P (Continued)

FOREIGN PATENT DOCUMENTS

JP          09-224348 A    8/1997
JP          H09-224348 A * 8/1997
WO       2021/244715 A1   12/2021

*Primary Examiner* — Gregory Robert Weber
(74) *Attorney, Agent, or Firm* — MEDLER FERRO WOODHOUSE & MILLS PLLC

(57) ABSTRACT

A linear guide system has at least a first rail element and a second rail element, which are mounted to be linearly slidable opposite one another in and counter to an extraction direction, a linear drive, which includes a rotatable drive shaft and an electric motor configured for the transmission of a torque to the drive shaft. The linear drive is configured such that a rotational movement of the drive shaft causes a linear movement of the first and second rail elements relative to one another in or counter to the extraction direction. A locking element is provided, which can be set and reset between an unlocked position and a locked position, which, for blocking the rotational movement of the drive shaft in the locked position, is configured so as to engage in a form-locking or force-locking manner with an engaging element connected to the drive shaft in a rotationally fixed manner or configured as a portion of the drive shaft. An actuator is provided, which is configured for setting the locking element towards the engaging element from the unlocked position into the locked position, as well as for resetting the locking element from the locked position into the unlocked position.

13 Claims, 6 Drawing Sheets

(51) Int. Cl.
  *A47B 88/473* (2017.01)
  *A47B 88/483* (2017.01)
  *F16C 29/10* (2006.01)
  *F16H 19/06* (2006.01)
  *F16H 25/20* (2006.01)

(52) U.S. Cl.
  CPC ......... *F16C 29/10* (2013.01); *F16H 19/0663* (2013.01); *F16H 25/2454* (2013.01); *F16H 2019/0668* (2013.01); *F16H 2019/0686* (2013.01); *F16H 2025/204* (2013.01); *F16H 2025/2075* (2013.01)

(56) References Cited

U.S. PATENT DOCUMENTS 5,832,779 A * 11/1998 Madrid .................. F16H 25/20
  137/72
2020/0366159 A1   11/2020 Schneebacher et al.

\* cited by examiner

LOCKING SYSTEM

CROSS REFERENCE TO RELATED APPLICATIONS

This application claims benefit of European Patent Application No. 22164203.6 filed Mar. 2, 2022.

The invention relates to a linear guide system having at least a first rail element and a second rail element, which are mounted so as to be linearly slidable opposite one another in and counter to an extraction direction, a linear drive, which comprises a rotatable drive shaft and an electric motor configured for the transmission of a torque to the drive shaft, wherein the linear drive is configured such that a rotational movement of the drive shaft causes a linear movement of the first and second rail elements relative to one another in or counter to the extraction direction.

BACKGROUND OF THE INVENTION

Linear guide systems in the sense of the present invention comprise telescopic rails and linear guides having at least two rail elements mounted so as to be linearly slidable opposite one another, preferably via rolling body bearings or sliding bearings. Telescopic rails differ from linear guides in that telescopic rails have rail elements of the same or similar length that are mounted so as to be linearly slidable opposite one another, whereas linear guides are characterized in that a short rail element, which is also referred to as a carriage, is slidably mounted on a longer rail element. Telescopic rails with two rail elements of the same or similar length are referred to as a partial extraction. Such telescopic rails cannot extend to twice the length of their fully retracted state due to the required overlapping of the rail elements, so that they do not separate from one another upon extraction, and due to the bearing arranged between the rail elements. Telescopic rails with more than two rail elements of the same or similar length are referred to as under-extraction, full extraction, or over-extraction, depending on whether their length in the fully extracted state is less than, the same, or longer than their length in the fully extracted state.

Linear guide systems are used in a wide variety of fields, for example in furniture, household appliances, and computer racks, but also in automotive construction and in many other applications. Typically, a rail element of the linear guide system is stationary, i.e. fixed to a body, while the further rail element(s) for driving a driving or extracting element, such as a drawer, is or are slidably mounted opposite the stationary rail element. Force-assisted systems are known, which support or cause the linear sliding of the rail elements opposite one another over a portion of the driving path or over the entire driving path by means of spring force or by means of an electric motor.

Examples of known force-assisted linear guide systems include end-feeders on telescopic rails for extraction elements, such as drawers, in which a force assistance is carried out during the insertion of the extraction element on the last driving distance shortly before and up to the insertion end position. The extraction element is first inserted by an operator up to a predetermined position, in which the slidable rail element then engages with the end-feeder and is pulled into the insertion end position by means of a pre-stressed spring.

Linear guide systems are also known in which the linear sliding of the rail elements opposite one another by means of an electric motor is caused, e.g. in the case of seat adjustment in motor vehicles. The electric motor transfers a torque to a drive shaft, which torque is further transferred to a linear drive, which then converts the rotational movement of the drive shaft into a linear movement of the rail elements relative to one another. For example, the linear drive can occur via a spindle or a toothed belt.

In order to still achieve a high driving speed of the rail elements opposite one another at a relatively low speed of the electric motor, the linear drive is to be designed with a high transmission of the speed of the electric motor to the linear movement. With a spindle drive, for example, this can be done via a high thread pitch of the spindle; with a toothed belt drive, the diameter of the pulley driving the toothed belt can be selected in the appropriate size. Also, with an interposed gear, the transmission from the rotational speed of the electric motor to the linear motion can be increased as well.

In all cases, increasing the transmission in order to achieve higher driving speeds is associated with the electric motor also having to apply a higher force or torque in order to cause the linear movement of the rail elements than with a lower transmission. Suitable electric motors that can apply the required force or torque when powered with current are available. If a certain driving position of the rail elements is achieved and is to be maintained, the electric motor is usually switched to currentless, also in order to save energy. In stepper motors, a low holding current is applied. If a force in one of the driving directions is now exerted in such a high-transmission system on the driven rail element, this force is transferred via the linear drive and the transmission into a torque on the drive shaft and thus to the electric motor. Also in the currentless state or in the case of a stepper motor with a low holding current, the electric motor nevertheless usually counteracts a certain holding force acting on the motor shaft, which is, however, significantly lower than in the current-powered state. Vice versa, the result of a high transmission, which is advantageous for achieving higher driving speeds when transferring the torque from the electric motor to the linear drive, is that already a lower force on the rail element in one of the driving directions causes a higher torque on the drive shaft and further on the motor than with a lower transmission. This can have the disadvantageous consequence that the holding force of the electric motor in the currentless state is not sufficient to hold the rail elements in a driving position when a low force in one of the driving directions already affects a rail element. The rail elements can more easily be moved unintentionally, e.g. by hand, out of their desired driving position.

PURPOSE OF THE INVENTION

The purpose to be addressed by the present invention was therefore to provide a linear guide system that reduces or avoids the aforementioned disadvantages.

DESCRIPTION OF THE INVENTION

This purpose is achieved by a linear guide system of the type mentioned above, which is characterized in that
a locking element is provided, which can be set and reset between an unlocked position and a locked position, which, for blocking the rotational movement of the drive shaft in the locked position, engages in a form-locking or force-locking manner with an engaging element connected to the drive shaft in a rotationally fixed manner or configured as a portion of the drive shaft, and an actuator is provided, which is configured for setting the locking element towards the engaging element from the unlocked position into the locked position, as well as for resetting the locking element from the locked position into the unlocked position.

The invention thus provides a locking system for a linear guide system, which, in a locked position, blocks a rotational movement of the drive shaft and thus the transmission of a torque therefrom to the electric motor when a rail element is acted upon by a force in one of the driving directions while the system is in the locked position. The system according to the invention is suitable for locking a linear guide system in a driving position and preventing an unintended driving of the rail elements. Advantageously, the system according to the invention is not limited to being locked in a single driving position or a plurality of defined driving positions of the rail elements of the guide system. Rather, in the system according to the invention, the locking element can be engaged with the engaging element at any driving position of the rail elements and can thus lock the linear guide system in any driving position. When a locking in each driving position is referred to below, this also includes locks that are only possible at short distances from one another, for example when the engagement between the interlocking element and the engaging element occurs via a toothing and the distance from one locked position to the next is determined by the distance or size of two adjacent teeth, respectively.

The actuator causes the setting of the locking element to the engaging element from the unlocked position into the locked position, as well as the resetting of the locking element away from the engaging element from the locked position into the unlocked position, in which the locking element is disengaged from the engaging element to release the lock.

In one embodiment of the invention, the linear guide system is a telescopic rail with rail elements mounted so as to be linearly slidable opposite one another and having the same or similar lengths. In a further embodiment of the invention, the linear guide system is a linear guide with at least one short rail element (carriage) slidably mounted on a substantially longer rail element, at least twice as long. The locking system according to the invention is advantageously equally applicable to both variants of linear guide systems.

The rail elements of the linear guide system according to the present invention are preferably made from a material selected from the group consisting of sheet steel, aluminium sheet steel, and stainless steel. The rail elements of the linear guide system according to the invention can be made of different materials or all of the same material, depending on the specifications.

Preferably, the rail elements of the linear guide system according to the invention are mounted in a linearly slidable manner opposite one another via rolling body bearings or sliding bearings. Such bearings improve the running characteristics of the linear guide system and significantly reduce friction between the rail elements. Particularly preferred are rolling body bearings. Suitable examples of rolling bodies are balls, rollers, barrels, needles or cones. Preferably, the rolling bodies are housed in a rolling body cage. In one embodiment of the present invention, the rolling bodies are balls and the rolling body cage is a ball cage.

The linear guide system of the present invention comprises at least a first rail element and a second rail element. In one embodiment, the linear guide system is a telescopic rail configured as a partial extraction with exactly two rail elements, a first rail element and a second rail element. In a further embodiment, the linear guide system is a telescopic rail comprising at least one further rail element in addition to the first rail element and the second rail element. One or more further rail elements can be arranged between the first and the second rail elements and/or externally thereto and slidably mounted in a linear manner opposite thereto. The telescopic rail of this embodiment is configured as an under-extraction, full extraction, or over-extraction.

In the sense of the present invention, the pull-out direction is understood to be the direction in which the first rail element and the second rail element can be moved relatively linearly to one another, to move from a retracted position to a pulled-out position. Accordingly, the pull-out direction or insertion direction is understood to mean the opposite direction, in which the rail elements are moved relative to one another to return to the retracted position. Overall, the driving direction refers to a direction in the extraction direction or the retraction direction.

The linear guide system according to the invention comprises a linear drive, which comprises a rotatable drive shaft and an electric motor configured for the transmission of a torque to the drive shaft, wherein the linear drive is configured such that a rotational movement of the drive shaft causes a linear movement of the first and second rail elements relative to one another in or counter to the extraction direction.

An electric motor in the sense of the present invention is a motor comprising a rotating motor shaft for providing a torque. In one embodiment of the invention, the electric motor is selected from a group consisting of a stepper motor, a brushless DC motor (BLDC), or a brushed DC motor (DC). In order to transfer the required torque from the electric motor to the drive shaft, in one embodiment of the invention, the motor shaft of the electric motor is coupled to the drive shaft via a transmission or a coupling. In a further embodiment according to the invention, the drive shaft is simultaneously the motor shaft of the electric motor or is integrally formed therewith or otherwise fixedly connected to it.

In the sense of the present invention, when it is stated that two elements are connected to one another in a rotationally fixed manner, this means a connection in which a rotational movement is transferable from one element to the other substantially without slippage, and the blocking or stoppage of one element causes a blocking or stoppage of the other element.

In one embodiment of the invention, the linear drive is a spindle drive comprising a spindle, namely a threaded spindle, which is configured and arranged such that a rotational movement of the spindle causes a linear movement of the first and second rail elements relative to one another in or counter to the extraction direction. The drive shaft of the linear drive is configured at least in sections as a spindle with a thread or is connected to the spindle in a rotationally fixed manner such that a rotational movement of the drive shaft causes a rotational movement of the spindle.

In the embodiment of the invention in which the linear drive is a spindle drive, a tappet connected to the first or the second rail element is further provided, which tappet is configured so as to engage with the thread of the spindle and, in the event of a rotational movement of the threaded spindle, takes the connected rail element along with it. Preferably, the tappet is a spindle nut or a profile engaging with the thread of the spindle from the rail element in the form of one or more teeth, protrusions, flaps, or characteristics. The threaded spindle is expediently arranged so as to be stationary with respect to the rail element not connected to the tappet.

In a further embodiment of the invention, the linear drive is a belt drive, wherein the linear drive comprises an open, closed, or continuous belt, preferably a toothed belt, and a pulley that drives the belt or toothed belt, which are configured and arranged in such a way that a rotational movement of the pulley causes a driving of the belt or toothed belt and the driving of the belt or toothed belt causes a linear movement of the first and second rail elements relative to one another in or counter to the extraction direction. In this embodiment, the drive shaft of the linear drive is configured as a pulley at least in sections or is connected to the pulley in a rotationally fixed manner such that a rotational movement of the drive shaft causes a rotational movement of the pulley.

In the sense of the invention, an open belt means one with two free ends not connected to one another. A closed belt in the sense of the invention can be made from an open belt by connecting the free ends by means of a connecting piece, which can comprise, for example, a tappet for a rail element. A particular variant of the closed belt is the continuous belt, which is made as a single piece without free ends, comparable to the V-belt on a motor vehicle. A closed belt, i.e. also a continuous belt, is guided over at least two diversion pulleys or rollers. In a linear drive of the present invention, the closed or continuous belt is moved in opposite directions depending on the direction of driving of the rail elements, i.e. the direction of insertion or extraction, or guided around the diversion pulleys or rollers. The circumferential movement of the belt in one direction or the other is limited by the full insertion or extraction of the rail elements opposite one another.

Expediently, the belt of the belt drive is configured as an open, closed, or continuous flat belt having surfaces facing one another and having a width suitable for engagement with the pulley. The provision of alternative belt cross-sections lies within the skillset of the person skilled in the art.

Preferably, the belt of the belt drive is a toothed belt with a toothing protruding from the belt surface, which engages with a corresponding toothing on the circumference of the pulley. However, the surface of the belt provided for engagement with the pulley can also be profiled or configured differently than with a toothing, as long as a positive and/or non-positively locking engagement with the pulley is ensured, which causes a driving of the belt without significant slippage upon a rotational movement of the pulley.

The belt is expediently arranged in its longitudinal extension parallel to the extraction direction of the rail elements and the axis of rotation of the pulley perpendicular thereto. In a preferred embodiment, the belt and pulley are fixedly arranged relative to one of the first and second rail elements, while the other rail element is taken along by the driven belt in or counter to the extraction direction. For this purpose, the rail element taken along can be fixedly or releasably connected to the belt. Alternatively, the rail element can comprise a tappet that engages with a toothing or other profile on the belt similar to the spindle drive and engages with it such that the rail element is taken along by the driven belt in or counter to the extraction direction. The same surface of the belt which also engages with the pulley can serve to engage the tappet with the belt. Alternatively, the surface of the belt which is opposite to the pulley can also be configured for engagement with the tappet, e.g. the belt can have a toothing on both opposed surfaces.

In a preferred embodiment, the belt is a continuous belt or a belt that is closed off from an open belt by the connection of the free ends by means of a connecting element and is aligned parallel to the extraction direction of the rail elements. Expediently, for a diversion of the enclosed or continuous belt, two diversion pulleys or rollers are provided at the end portions in the longitudinal extension of the belt, wherein preferably one of the diversion pulleys is the driven pulley. When the rail elements are slid opposite one another, the rotational direction of the pulley, and thus the direction of driving of the belt, changes around the diversion discs or rollers, depending on the direction of driving of the rail elements.

In an alternative embodiment, the belt is an open belt with free ends, which is aligned parallel to the extraction direction of the rail elements. In the embodiment of the linear drive according to the invention with an open belt, it is preferably fixedly connected to the first or the second rail element, e.g. flatly abutting an inner side of the first or second rail element, while the pulley is fixedly arranged with respect to the other rail element in such a way that it engages with the belt. As an alternative to an open belt, a toothed rack can also be provided in a corresponding arrangement.

The linear guide system according to the invention comprises an actuator, which is configured for setting the locking element towards the engaging element from the unlocked position into the locked position, as well as for resetting the locking element from the locked position into the unlocked position. Upon setting, the locking element is brought into engagement with the engaging element in the locked position in a form-locking or force-locking manner, and the rotational movement of the drive shaft is blocked, because the engaging element is connected to the drive shaft in a rotationally fixed manner or is formed as a portion of the drive shaft. Upon resetting, the locking element is removed from the engaging element, disengaged, and the locking mechanism is released.

For a form-locking and/or force-locking engagement in the locked position, the locking element and the engaging element are shaped or profiled accordingly, at least in the portions where the engagement occurs. Advantageously, for example, there is a wave profile or tooth profile on at least one of the elements, preferably on both elements, for a form-locking engagement. Recesses or bores on an element and one or more protrusions, tenons, or spikes on the counter-element are also suitable.

Depending on which portions and with which profiling the engagement surfaces are configured on the locking element and on the engaging element and from which direction the feeding of the locking element to the engaging element takes place, it is advantageous to the provide engagement aids, e.g. feeding inclines, on the profiling.

In an advantageous embodiment of the linear guide system according to the present invention, the engaging element is configured and arranged substantially rotationally symmetrically with respect to the axis of rotation of the drive shaft. The engaging element of this embodiment can be configured as a profile, e.g. a toothing, in the circumferential direction on the surface of the drive shaft. In an advantageous embodiment, however, the engaging element has a larger diameter than the drive shaft and is further preferably substantially discoid or cylindrical and connected to the drive shaft in a rotationally fixed manner.

The further away from the axis of rotation of the engaging element the engagement of the locking element with the engaging element occurs, the less is the retention force to be applied by the engagement between the locking element and the engaging element to block the drive shaft against an acting torque. A large radial distance of the engagement with the locking element from the axis of rotation can therefore have advantages with respect to the holding force to be applied and thus to the construction and attachment of the individual elements in the overall system. On the other hand, the design space available for the required elements must be considered.

In one embodiment of the invention, on a surface facing radially outward to the axis of rotation of the drive shaft, i.e. the circumferential surface or lateral surface, the engaging element comprises an engagement profile for engaging with the locking element, and the locking element comprises a counter-profile configured for form-locking engagement with the engagement profile of the engaging element in the locked position. In an advantageous embodiment, the engagement profile of the engaging element is a toothed profile or wave profile formed by protrusions and/or recesses on a surface of the engaging element.

In a further embodiment of the invention, on a surface axially facing the axis of rotation of the drive shaft, e.g. an end face, the engaging element comprises an engagement profile, and the locking element comprises a counter-profile configured for form-locking engagement with the engagement profile of the engaging element in the locked position. Also in this embodiment, the engagement profile of the engaging element can advantageously be a toothed profile or wave profile formed by protrusions and/or recesses on a surface of the engaging element. Alternatively or in addition, bores, e.g. blind bores or through-bores, are provided on an element, and tenons, pins, or spikes are provided on the counter-element, which are inserted into the bores of the other element for an engagement and locking of the elements opposite one another.

In a further embodiment of the invention, the engaging element comprises engagement profiles on both a surface facing radially outward to the axis of rotation of the drive shaft and a surface axially facing the axis of rotation of the drive shaft, i.e. a combination of the two aforementioned embodiments.

The engagement profile on the engaging element and the counter-profile on the locking element can be substantially complementary in that the profiles fully abut one another over one region in the locked position. However, for a positively locking engagement in the locked position, it can also be sufficient when the profiles only abut one another in sections with their respective surfaces, or even only selectively or at an edge of an element. For a force-locking engagement in the locked position, e.g. a friction lock, a surface contact of surface portions of the engaging element and the locking element while simultaneously applying a pressing force and/or providing a surface roughness which increases the friction is advantageous to ensure a sufficient holding force in the locked position.

The setting and resetting of the locking element towards the engaging element into the locked position and back into the unlocked position caused by the actuator can be accomplished in various ways and different paths. When the setting path of the locking element to the engaging element into the locked position is referred to below, the resetting is expediently carried out in the same way in the opposite direction into the unlocked position.

In one embodiment of the invention, the locking element is mounted such that the setting of the locking element towards the engaging element from the unlocked position into the locked position occurs linearly parallel to the axis of rotation of the drive shaft.

In a further embodiment of the invention, the locking element is mounted such that the setting of the locking element towards the engaging element from the unlocked position into the locked position occurs linearly radially to the axis of rotation of the drive shaft.

In a further embodiment of the invention, the locking element is supported such that the setting of the locking element towards the engaging element from the unlocked position into the locked position is carried out on a linear or curved path with direction components that are parallel and radial to the axis of rotation of the drive shaft.

In a further embodiment of the invention, the locking element is hingedly mounted in a manner such that the setting of the locking element towards the engaging element from the unlocked position into the locked position occurs on a circular path about a spin axis arranged parallel or perpendicular to the axis of rotation of the drive shaft.

The locking element is advantageously mounted for a linear setting or a setting on a curved path while being guided on a rail or in a slot and is subjected to a force towards the engaging element by means of the actuator. Advantageously, the mounting and guiding of the locking element occurs by means of a sliding guide. Alternatively, rolling body guides are also suitable.

According to the present invention, the force to be applied by the actuator for the setting and resetting of the locking element can be carried out by the same means, similar means, or different means on the actuator. A setting and resetting of the locking element by the same means can occur, for example, by a spindle drive, in which the spindle is rotated in the opposite direction for the setting and resetting, respectively, and takes the locking element with it. Alternatively, for a setting and resetting of the locking element by the same means, a lifting magnet with a reversible pole can be used, which moves the locking element in the setting or resetting direction, depending on the pole. Such a lifting magnet can advantageously comprise a permanent magnet on one or both end positions, i.e. in the unlocked position and/or the locked position, which holds the movable armature of the lifting magnet in the end position.

In a preferred embodiment of the invention, the setting and resetting of the locking element are carried out by different means on the actuator. According to the present invention, suitable and advantageous means for setting or resetting the locking element in one direction include an electrically operated linear actuator, an electrically activatable shape memory actuator, an electrically activatable or triggerable lifting magnet, an electrically activatable or triggerable spring element. Aforementioned means for a setting or resetting can be combined with any of the foregoing means for the opposite direction of movement of the locking element. Combinations of two or more means for a direction of movement of the locking element are also possible, for example the support of the setting or resetting force of an electrically operated linear actuator by a spring element.

Linear guide systems of the type according to the invention are generally held in a certain driving position for a long period of time, i.e. with the locking element and the engaging element in the locked position, while an unlocking is only required for the driving of the rail elements. It is therefore expedient for economic reasons, among other things, when the system is kept currentless to the extent possible, or only with a low holding current, in the locked position.

It is therefore advantageous when the setting of the locking element towards the engaging element in the locked position is carried out by means that are configured so as to keep the locking element and the engaging element currentless in the locked position while still applying a holding force against a release of the locked position. A spring element that is prestressed toward the locked position or a lifting magnet, which is also held currentlessly in the end position of the locked position, for example by means of an additional permanent magnet, is suited for this purpose. Because the driving of the rail elements typically only requires a short-term unlocking each time, a powered means is suitable for the resetting of the locking element into the unlocked position, which means exerts sufficient force to also bring the means for the setting from the unlocked position into the unlocked position, for example to prestress a spring element used for the setting back into the unlocked position.

In a preferred embodiment according to the invention, the setting of the locking element towards the engaging element in the locked position occurs by means of a spring element or several spring elements and the resetting into the unlocked position occurs by means of an electrically activatable lifting magnet or by means of an electrically activatable shape memory drive.

Lifting magnets, shape memory drives, and spring elements for setting and/or resetting have the advantage that the setting or resetting is comparatively fast compared to, for example, a spindle drive.

As already explained, in embodiments of the invention, the actuator comprises an electrically activatable or electrically triggerable shape memory drive. Such shape memory drives or shape memory actuators as an alternative to electric motors are generally known and commercially available, for example from Kunststoffverarbeitung Hoffmann GmbH, Heiligenhaus, Germany. They use wires made from shape memory alloys, usually nitinol, which, when an electric current is applied, shorten and exert a lifting or pushing force on a positioning element connected to the wire, which can be used for setting of the locking element towards the engaging element. Depending on the design, shape memory actuators are capable of providing forces in the order of 5-15 Newtons and several millimetre stroke distances.

In a preferred embodiment, the actuator comprises a shape memory actuator for unlocking, i.e. resetting the locking element out of engagement with the engaging element from the locked position into the unlocked position, and a spring element, which can also comprise several springs and which causes or at least supports the setting of the locking element into the locked position. In so doing, the spring element expediently engages with either the positioning element of the shape memory actuator or the locking element to reset the locking element and, connected thereto, the positioning element of the shape memory actuator into the locked position when the shape memory actuator is switched to currentless.

Preferably, according to the present invention, the setting and the resetting of the locking element are electrically or electronically triggered by the actuator and at least one of the two, preferably the resetting into the unlocked position, are electrically operated and held with current in the respective position, for example by means of an electric motor or a shape memory actuator. In the event of a fault, for example in the event of a power failure or if the electronics of the system are disrupted, an electrical unlocking cannot occur. In one embodiment of the invention, therefore, the system comprises an emergency unlocking mechanism, which is configured so as to bring the locking element out of engagement with the engaging element from the locked position into an unlocked position through the application of force by an operator. Such an emergency unlocking mechanism is to be manually actuated, for example, by a lever, a slider, or a pulley on the locking element or in connection with the latter, to disengage the locking element from the engaging element and to unlock the system. The emergency unlocking mechanism is advantageously used to perform a manual unlocking as needed or in the event of an outage of the electrical unlocking, for example in the event of a power failure or if the electronics of the system are disrupted.

In one embodiment of the linear guide system according to the invention, between the electric motor and the drive shaft, a coupling is provided, having a first coupling element, which is connected to the electric motor in a rotationally fixed manner, and a second coupling element, which is connected to the drive shaft in a rotationally fixed manner, wherein the coupling connects the electric motor and the drive shaft to one another in such a way that a torque is transferred from the electric motor to the drive shaft, wherein the first coupling element and the second coupling element are engaged with one another in a form-locking or force-locking manner.

In a preferred embodiment, the coupling is a magnetic coupling, and the first coupling element and the second coupling element are engaged with one another in a force-locking manner due to a magnetic force. In the case of a suitable magnetic coupling according to the present invention, at least one of the two coupling elements or both coupling elements comprise a permanent magnet for causing a magnetic attractive force between the coupling elements. In one embodiment, at least one permanent magnet is arranged in a ferromagnetic bowl.

Expediently, the first coupling element of the magnetic coupling comprises a first friction surface and the second coupling element comprises a second friction surface, which are arranged and aligned such that the first friction surface and the second friction surface are frictionally engaged with one another in the coupled state, such that the torque is transferred through a frictional locking between the first friction surface and the second friction surface. The frictional locking of the coupling elements is reinforced by the magnetic attraction between the frictionally engaged surfaces of the coupling elements.

In one embodiment of the invention, the engaging element of the linear guide system is formed on the first or second coupling element of the magnetic coupling or is connected to the first or second coupling element in a rotationally fixed manner.

FIGURES

Further advantages, features, and possible applications of the present invention will become apparent from the following description of an embodiment according to the invention and the associated figures. In the figures, like elements are identified with the same reference numbers.

Figure 2:
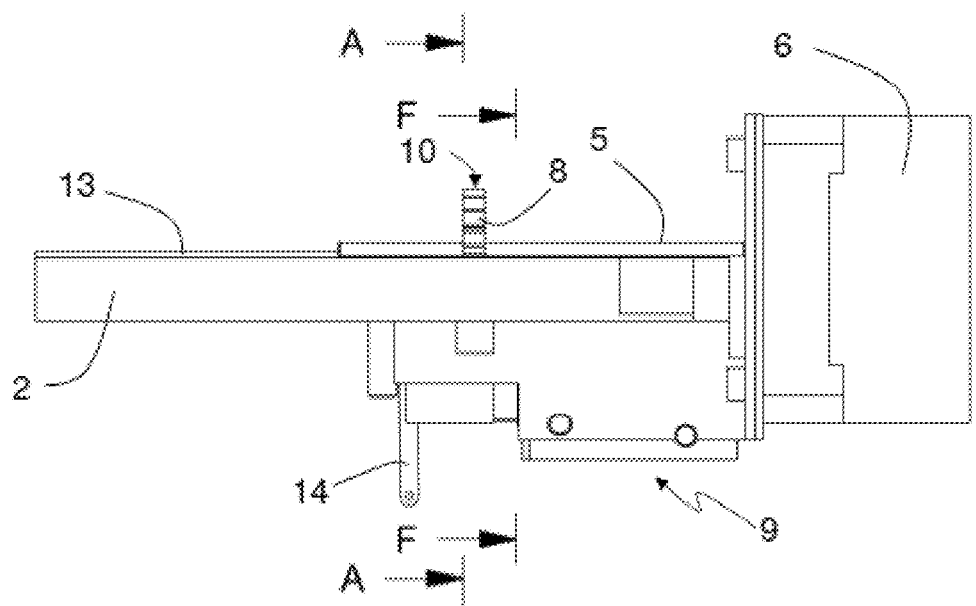
FIG. 2 shows a partially broken-away schematic view of the linear guide system in a locked position from the side.
Figure 3:
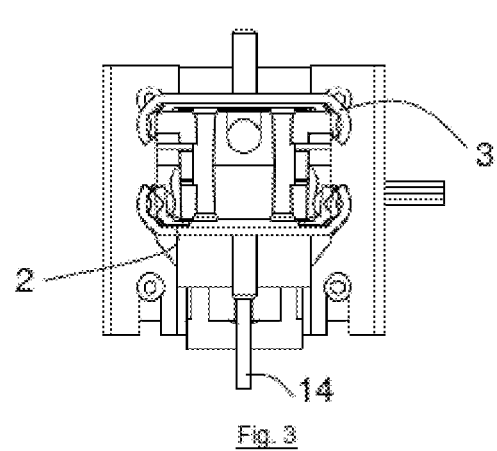
FIG. 3 shows a schematic view of the linear guide system shown partially broken away in FIG. 2 in a direction of view from the left in FIG. 2.
Figure 4:
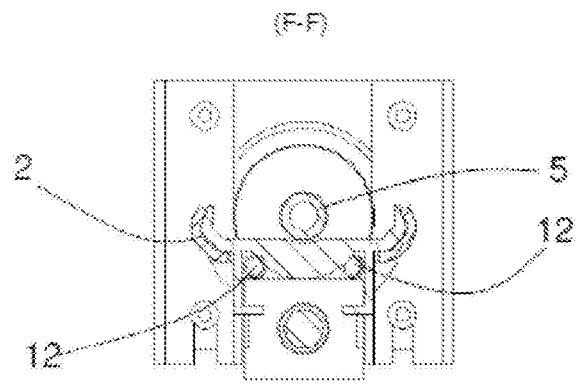
FIG. 4 shows a view of a section along the cutline F-F in FIG. 2 in the direction of view of the arrows in FIG. 2.
Figure 5A:
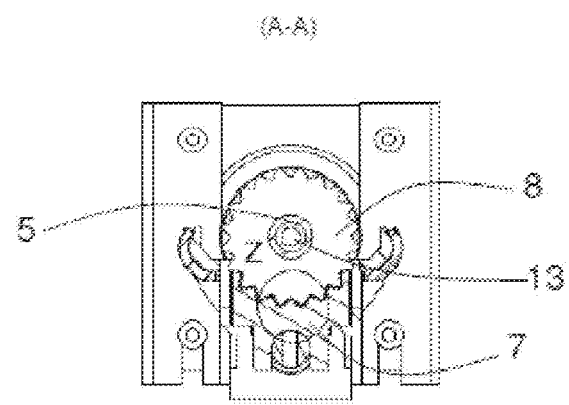
Figure 5B:
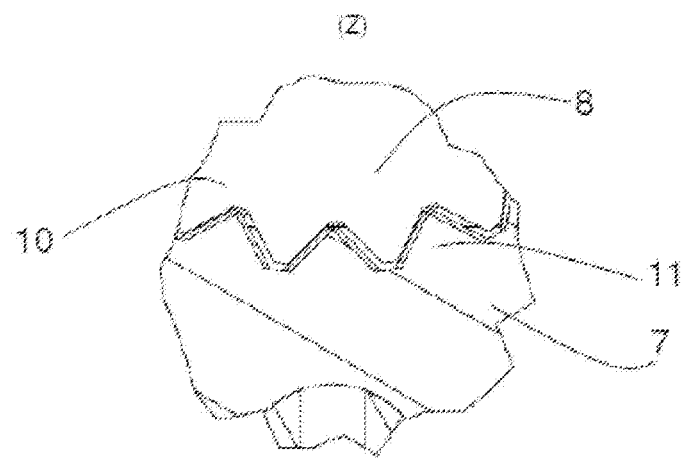

The top part of FIG. 5 shows a view of a section along the cutline A-A in FIG. 2 in the direction of view of the arrows in FIG. 2, and the bottom part of FIG. 5 shows an enlargement of the circular cut-out of the locking element marked Z in the top part of FIG. 5 in engagement with the engaging element.

Figure 1:
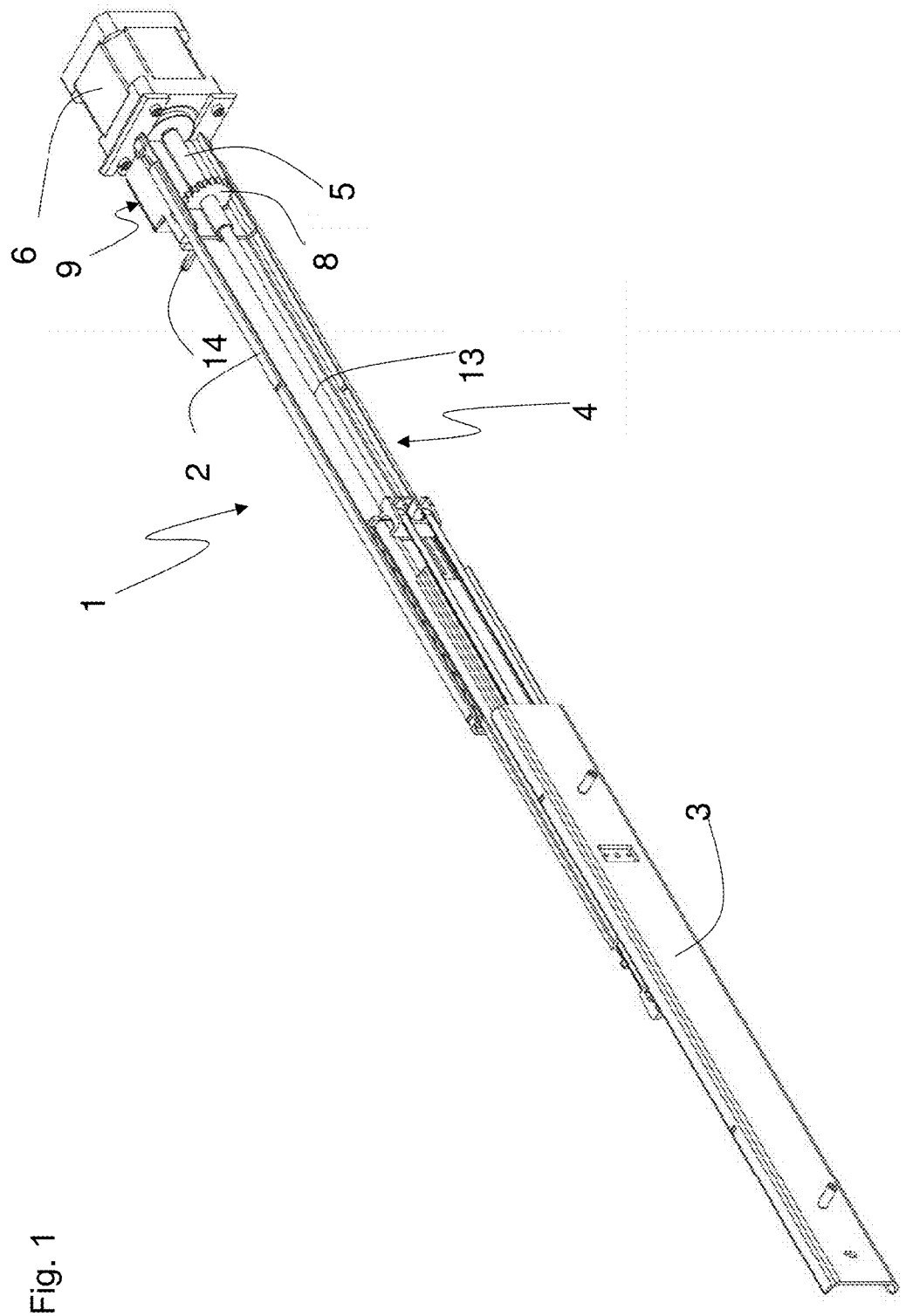
FIG. 1 shows a perspective view of a first embodiment of a linear guide system according to the invention, having a linear drive configured as a spindle drive.
Figure 6:
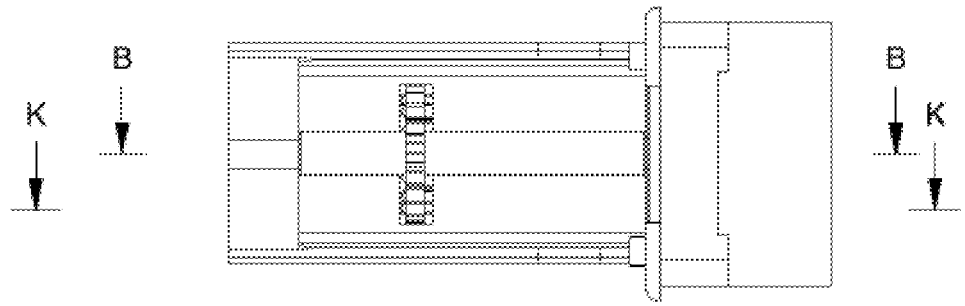

FIG. 6 shows a broken-away schematic view of the linear guide system of FIGS. 1 and 2 in an aerial view.

Figure 7:
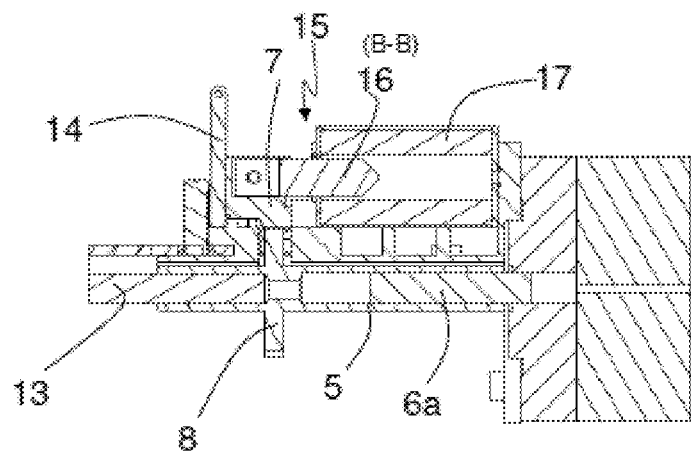

FIG. 7 shows a view of a section along the cutline B-B in FIG. 6 in a locked position.

Figure 8:
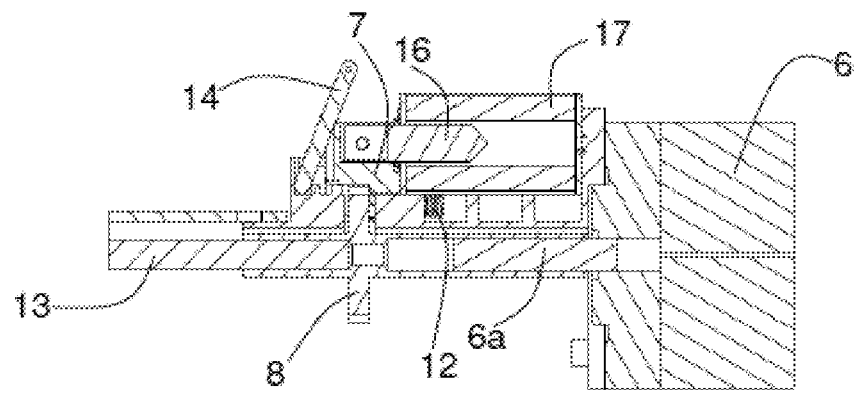

FIG. 8 shows a cross-sectional view corresponding to FIG. 7 in an unlocked position.

Figure 9:
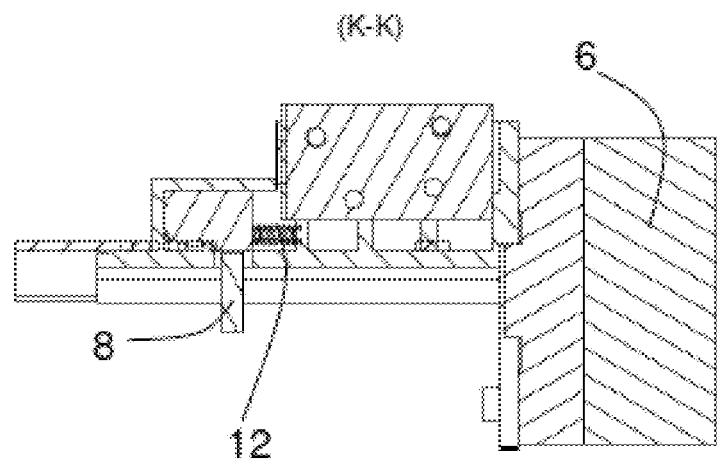

FIG. 9 shows a view onto a section along the cutline K-K in FIG. 8.

Figure 10:
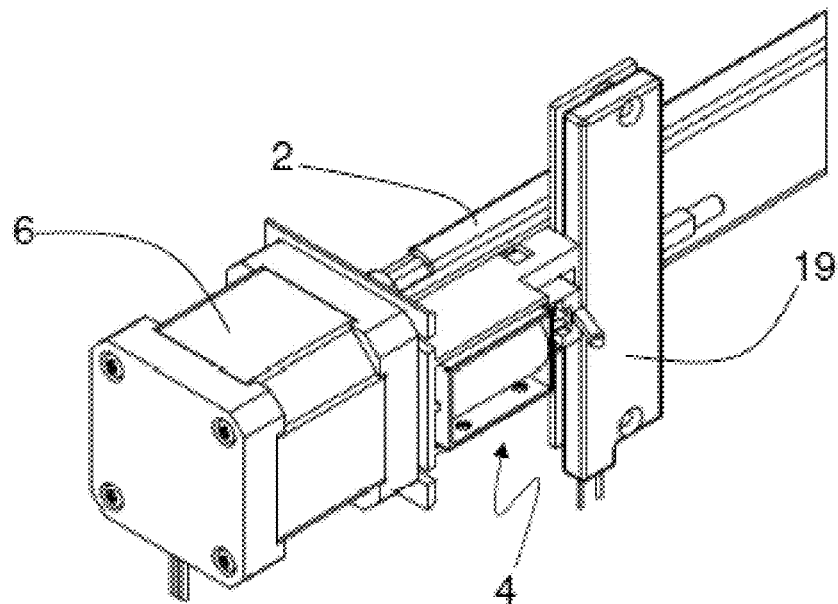

FIG. 10 shows a broken-away perspective view of an alternative embodiment of a linear guide system according to the invention, having a shape memory actuator on the actuator.

Figure 11:
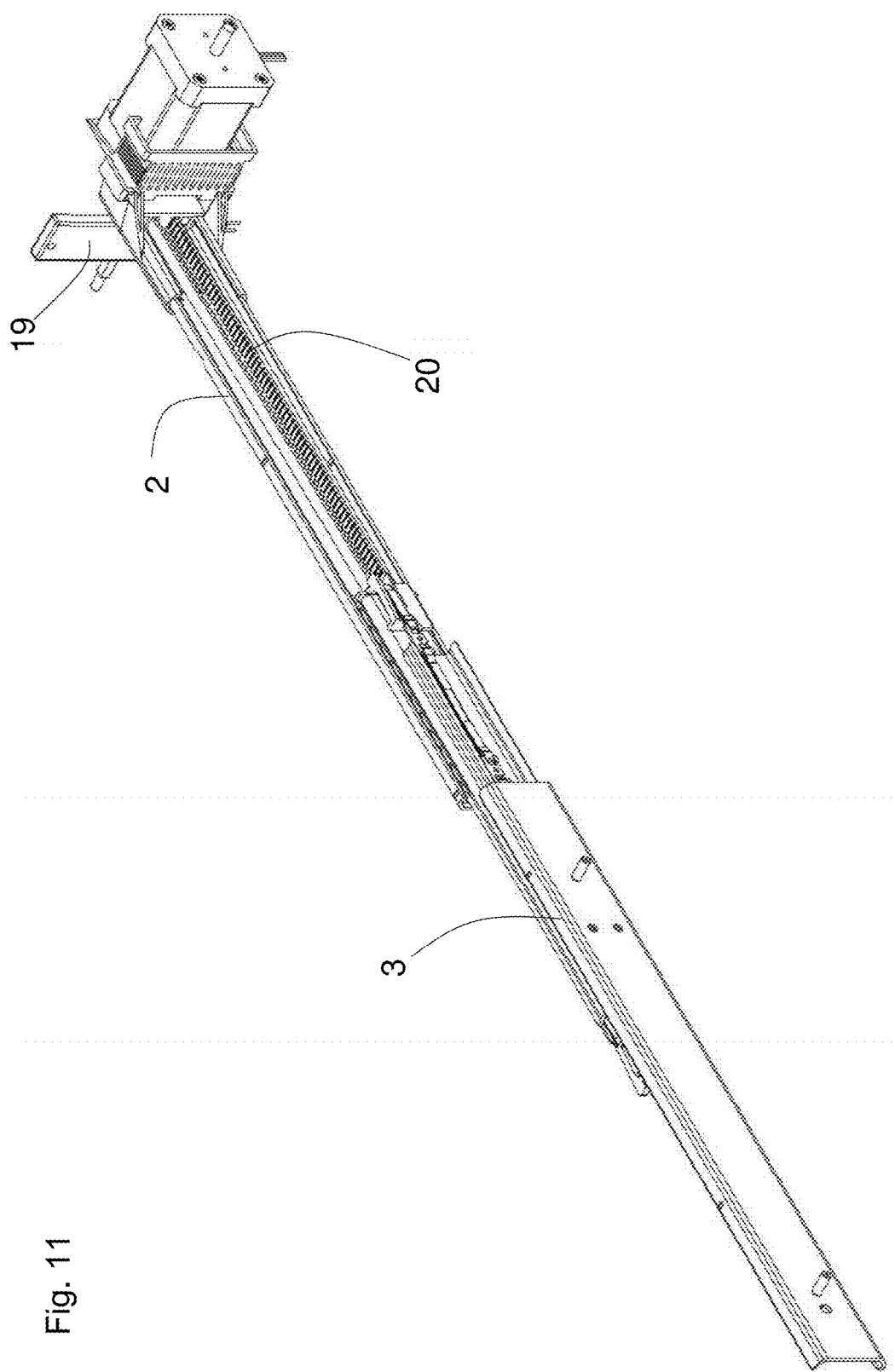

FIG. 11 shows a perspective view of a further alternative embodiment of the linear guide system according to the invention, having a belt drive on the linear drive and a shape memory actuator on the actuator.

FIGS. 1 to 9 show different views of a first embodiment of a linear guide system 1 according to the invention, having a first rail element 2 and a second rail element 3 with a substantially C-shaped profile, which are mounted so as to be linearly slidable opposite one another in and counter to an extraction direction via a linear drive 4. As shown in the overall perspective view in FIG. 1, the electric motor 6 is fixedly arranged with respect to the first rail element 2 at the end thereof. The motor shaft of the electric motor 6 is integrally formed with the drive shaft 5. A threaded spindle 13 extends coaxially to the drive shaft 5 and is connected thereto in a rotationally fixed manner. A discoidal engaging element 8 is arranged coaxially to the drive shaft 5 and is connected thereto in a rotationally fixed manner. The engaging element 8 comprises a radially outward-facing toothing on its circumferential surface for engagement with a locking element 7. Similarly fixed in place with respect to the first rail element 2, an actuator 9 is provided, which is configured for setting the locking element towards the engaging element 8 from an unlocked position into a locked position, as well as for resetting the locking element 7 from a locked position into an unlocked position. The second rail element 3 is connected to the threaded spindle 13 via a tappet such that a rotational movement of the threaded spindle 13 causes a linear movement of the second rail element 3 relative to the first rail element 2 in or counter to the extraction direction.

The sectional views of FIGS. 4, 5, 7, 8, and 9 show details of the actuator 9 as well as the engaging element 8 and the locking element 7. The actuator 9 comprises a lifting magnet 15 for resetting the locking element 7 from a locked position into the unlocked position and a spring element 12 having two single springs for setting the locking element 7 towards the engaging element 8 from the unlocked position into the locked position. The lifting magnet 15 comprises an armature 16, which is guided in a coil 17 and is connected to the locking element 7 and moves it in a linearly guided manner from the locked position into the unlocked position upon an electrical activation of the lifting magnet and brings it out of engagement with the engaging element 8.

The sectional view in FIG. 7 shows the system in the locked position, and the sectional view in FIG. 8 shows the system in the unlocked position. In the unlocked position, the spring element 12 is prestressed towards the locked position against the locking element 7 and pushes it into the locked position when the lift magnet is switched to currentless. By means of an emergency unlocking lever 14, the system can be manually unlocked, for example in the event of a power failure, in that it is pushed towards the armature of the lifting magnet and thereby pushes the armature of the lifting magnet and the locking element connected thereto into the unlocked position.

FIG. 5 shows a flush sectional view along the cutline A-A in FIG. 2 in a locked position of the system in which the locking element 7 is engaged with the engaging element 8. The cut-out enlargement Z in the bottom part of FIG. 5 shows the engagement of the toothed engagement profile 10 of the engaging element 8 with the correspondingly toothed counter-profile 11 of the locking element 7, whereby a rotational movement of the drive shaft is blocked and thus a further driving of the rail elements opposite one another is prevented.

FIG. 10 shows a broken-away perspective view of an alternative embodiment, in which, instead of a lifting magnet, the actuator comprises a shape memory drive 19 for resetting the locking element from the locked position into the unlocked position. In the housing, the shape memory actuator comprises a wire made of the shape memory metal nitinol, which, when activated with a flow of current, shortens and pushes a positioning element, comparable to the armature 16 of the previously described lifting magnet 15, into the unlocked position (not shown). The positioning element of the shape memory actuator 19 is connected to the locking element and brings the locking element out of engagement with the engaging element while driving it into the unlocked position.

In the further alternative embodiment of a linear guide system according to the invention as shown in FIG. 11, the linear drive comprises a closed toothed belt 20 that extends in the longitudinal direction of the rail elements and is configured as a flat tape and is toothed on the inwardly facing surface. In this embodiment, the toothed belt 20 is driven by means of a pulley (not shown) connected to the drive shaft and also bearing a toothing in a circumferential manner to drive the first and second rail elements 2, 3 and is diverted at the motor-side end of the linear guide system. The second rail element 3 is connected to the toothed belt 20 via a tappet. In the embodiment shown in FIG. 11, like the embodiment according to FIG. 10, the actuator comprises a shape memory actuator for resetting the locking element from the locked position into the unlocked position, as well as a spring element for setting the locking element towards the engaging element from the unlocked position into the locked position.

For the purpose of the original disclosure, it should be noted that all of the features as they become apparent to a person skilled in the art from the present description, the drawings, and the claims, even if they have been specifically described only in connection with specific other features, can be combined both individually and in any combination with other features or groups of features disclosed here, insofar as this has not been expressly excluded or technical circumstances make such combinations impossible or pointless. A comprehensive, explicit presentation of all conceivable combinations of features is omitted here solely for the sake of brevity and legibility of the description.

Although the invention has been presented and described in detail in the drawings and the foregoing description, this representation and description is merely an example and is not intended to limit the scope of protection as defined by the claims. The invention is not limited to the embodiments shown.

Modifications of the disclosed embodiments will be obvious to those skilled in the art from the drawings, the description, and the appended claims. In the claims, the word "comprise" does not exclude other elements or steps, and the indefinite article "a" does not exclude a plurality. The mere fact that certain features are claimed in different claims does not preclude their combination. Reference numbers in the claims are not intended to limit the scope of protection.

LIST OF REFERENCE NUMBERS

1 Linear guide system
2 First rail element
3 Second rail element
4 Linear drive
5 Drive shaft
6 Electric motor
6a Motor shaft
7 Locking element
8 Engaging element
9 Actuator
10 Engagement profile of the engaging element 8
11 Counter-profile of the locking element 7
12 Spring element
13 Threaded spindle
14 Emergency unlocking lever
15 Lift magnet
16 Armature
17 Coil
19 Shape memory actuator
20 Toothed belt

The invention claimed is:

1. A linear guide system, comprising:
at least a first rail element and a second rail element, which are mounted so as to be linearly slidable opposite one another in and counter to an extraction direction via rolling body bearings;
a linear drive comprising:
  a rotatable drive shaft; and
  an electric motor configured for the transmission of a torque to the drive shaft,
  wherein the linear drive is configured such that a rotational movement of the drive shaft causes a linear movement of the first and second rail elements relative to one another in or counter to the extraction direction;
a locking element, which can be set and reset between an unlocked position and a locked position, which, for blocking the rotational movement of the drive shaft in the locked position, is configured so as to engage in a form-locking or force-locking manner with an engaging element connected to the drive shaft in a rotationally fixed manner or configured as a portion of the drive shaft; and
an actuator, which is configured for setting the locking element towards the engaging element from the unlocked position into the locked position, as well as for resetting the locking element from the locked position into the unlocked position,
wherein the locking element is mounted such that the setting of the locking element towards the engaging element from the unlocked position into the locked position occurs one of three ways:
  a) linearly parallel to the axis of rotation of the drive shaft,
  b) on a linear or curved path having direction components that are parallel and radial to the axis of rotation of the drive shaft, or
  c) on a circular path about a spin axis arranged parallel to or perpendicular to the axis of rotation of the drive shaft.

2. The linear guide system according to claim 1, wherein the linear drive comprises a threaded spindle, which is configured and arranged in such a way that a rotational movement of the threaded spindle causes a linear movement of the first and second rail elements relative to one another in or counter to the extraction direction, and
wherein the drive shaft of the linear drive is configured as at least sections of the threaded spindle or is connected to the threaded spindle in a rotationally fixed manner such that a rotational movement of the drive shaft causes a rotational movement of the spindle.

3. The linear guide system according to claim 1, wherein the linear drive comprises an open, closed, or continuous toothed belt and a pulley that drives the toothed belt, which are configured and arranged in such a way that a rotational movement of the pulley causes a driving of the toothed belt and the driving of the toothed belt causes a linear movement of the first and second rail elements relative to one another in or counter to the extraction direction, and wherein the drive shaft of the linear drive is configured as a pulley at least in sections or is connected to the pulley in a rotationally fixed manner such that a rotational movement of the drive shaft causes a rotational movement of the pulley.

4. The linear guide system according to claim 1, wherein the engaging element is configured and arranged substantially rotationally symmetrically with respect to the axis of rotation of the drive shaft.

5. The linear guide system according to claim 4, wherein the engaging element has a larger diameter than the drive shaft.

6. The linear guide system according to claim 4, wherein the engaging element is substantially discoidal or cylindrical.

7. The linear guide system according to claim 1, wherein the engaging element has an engagement profile on a surface facing radially outward from the axis of rotation of the drive shaft and/or on a surface facing in an axial direction of the axis of rotation of the drive shaft, and
the locking element has a counter-profile configured for a form-locking engagement with the engagement profile of the engaging element in the locked position.

8. The linear guide system according to claim 7, wherein the engagement profile
of the engaging element is a tooth profile or a wave profile formed by protrusions and/or recesses on a surface of the engaging element.

9. The linear guide system according to claim 1, wherein the actuator comprises an electrically operated linear actuator, an electrically operated spindle actuator, an electrically triggerable shape memory actuator, an electrically triggerable lifting magnet, an electrically triggerable spring element, or a combination thereof.

10. The linear guide system according to claim 1, wherein the actuator comprises at least one spring element,
which is prestressed in the locked position of the locking element for supporting or causing a resetting of the locking element from the locked position into the unlocked position or which is prestressed in the unlocked position of the locking element for supporting or causing a setting of the locking element from the unlocked position into the locked position.

11. The linear guide system according to claim 1, wherein an emergency unlocking mechanism is provided, which is configured so as to bring the locking element out of engagement with the engaging element from the locked position into an unlocked position through the application of force by an operator.

12. The linear guide system according to claim 1, wherein, between the electric motor and the drive shaft, at least one coupling is provided having a first coupling element, which is connected to the electric motor in a rotationally fixed manner, and a second coupling element, which is connected to the drive shaft in a rotationally fixed manner, wherein the coupling connects the electric motor and the drive shaft to one another in such a way that a torque is transferred from the electric motor to the drive shaft.

13. The linear guide system according to claim 12, wherein the coupling is a magnetic coupling, wherein the first coupling element and the second coupling element are engaged with one another in a force-locking manner due to a magnetic force or supported by a magnetic force.

* * * * *